Nov. 28, 1967 D. E. THOMAS ET AL 3,355,538

RADAR LANDMASS SIMULATOR

Filed Oct. 25, 1966 2 Sheets-Sheet 1

INVENTORS
DAVID E. THOMAS
ROBERT L. MERTEN
BY Harvey A. David

INVENTORS
DAVID E. THOMAS
ROBERT L. MERTEN

3,355,538
RADAR LANDMASS SIMULATOR
David E. Thomas and Robert L. Merten, Yellow Springs, Ohio, assignors, by mesne assignments, to the United States of America as represented by the Secretary of the Navy
Filed Oct. 25, 1966, Ser. No. 589,471
6 Claims. (Cl. 35—10.4)

ABSTRACT OF THE DISCLOSURE

A factored transparency type radar landmass simulator utilizing two adjacent and registered sections of a photographic emulsion on a glass transparency to store radar reflectance and terrain elevation data respectively. On one section of the transparency, gray levels are encoded which correspond to terrain elevation. This application discloses a method of encoding, by means of pairs of gray levels, more terrain elevations with fewer gray levels on the transparency than are now used, and also discloses logic circuitry for decoding this information as the gray levels are scanned by a light beam, and means for producing elevation signals for utilization in landmass simulation.

---

This invention relates to radar simulators of the factored transparency type for simulating radar displays or presentations which are characteristic of landmass radar return from terrain having variable elevation, and more particularly to an improved elevation coding technique and means for generating elevation signals therefrom.

A current form of radar landmass simulator utilizes two adjacent and registered or coordinated sections of a photographic emulsion on a glass transparency to store radar reflectance and terrain elevation data, respectively. On one section of the transparency, gray levels are encoded which correspond to terrain elevation. That is, a specific range of elevation values is assigned to each gray level on the elevation portion of the transparency. The transparency is scanned as by a flying spot scanner while photomultiplier means detects the changes in light transmission to provide an output which is used in producing a simulated radar display on a cathode ray tube.

There are, in view of the present and reasonably foreseeable states of the art, practical limits to the number of controllable density gray level increments which can be encoded on the transparency and reliably read out. This number is on the order of about 70 incremental levels of light transmission lying between no transmission and the maximum level of transmission that can be obtained without sacrifice of repeatability. Now, if each incremental gray level is assigned an elevation increment of 100 feet or less as is necessary to adequately simulate natural and cultural elevation variations, and the maximum elevation of the transparency is to be 16,000 feet for example, at least 60 gray levels would be required for just the first 6,000 feet of elevation. Clearly, 70 incremented gray levels, each assigned a specific elevation value, places severe limitations on the minimum incremental elevation value which can be assigned each gray level and on the maximum elevation which the transparency or other factored storage member can represent.

With the foregoing in mind it is one object of this invention to reduce the number of gray levels required on a factored storage member such as the transparencies discussed above.

Another object of this invention is to permit increase in the density value of the gray level increments without reducing the number of elevation values coded into the storage element, whereby the time and cost of manufacturing the factored storage elements may be reduced.

As another object of this invention aims to provide means for deriving many more elevation values from a given set of incremental gray levels than has been possible from the prior systems wherein each gray level represented a specific elevation value. Thus, with only 10 gray levels, for example, it is possible according to this invention to represent 40 different elevation values arranged in progressive sequence.

It is yet another object of this invention to accomplish the foregoing through the provision of a factored storage element, such as a transparency, reflecting member, or the like, wherein combinations of gray levels are encoded to form a plurality of different pairs of gray levels, each of which pairs represents a different elevation value, and the provision of logic means for interpreting the scanning of the gray level combinations and providing output signals representative of specific elevation values to utilization means such as the elevational channel of an otherwise conventional landmass radar simulator.

Other objects and many of the attendant advantages of this invention will be readily appreciated as the same becomes better understood by reference to the following detailed description when considered in connection with the accompanying sheets of drawings wherein.

Figure 1:
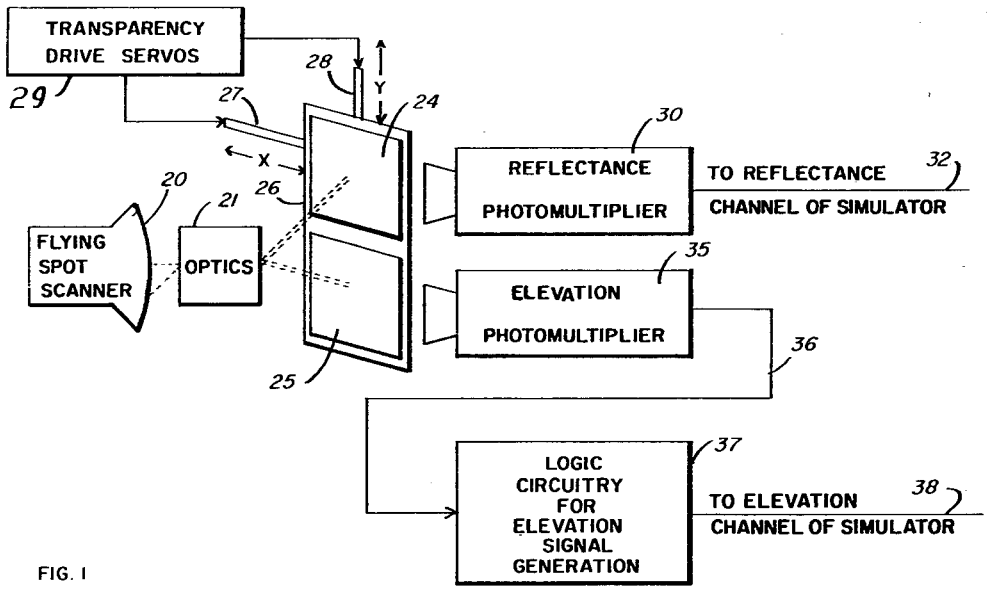
FIG. 1 is a block schematic and functional illustration of a portion of a landmass radar simulator embodying the present invention.

Referring to FIG. 1 wherein a portion of a landmass radar simulator is illustrated, a flying spot scanner 20 is provided as a reliable and readily controlled moving spot light source. The light from the scanner is split and focused by suitable optics 21 to illuminate two factored storage members in the form of transparencies 24 and 25 which are supported by a common frame 26 for movement. The transparency 24 has reflectance data encoded thereon, while the transparency 25 has terrain elevation data encoded thereon in a manner which will be more fully described as the specification proceeds.

The frame 26 holds the transparencies 24, 25 in proper registration and is movable in accordance with $x$ and $y$ output signals of an aircraft position computer (not shown) by suitable transparency drive servos 29 through mechanical coupling means 27, 28 so that the positions of the transparencies correspond to the simulated aircraft position.

A light responsive means such as reflectance photomultiplier 30 is disposed to receive light transmitted through the reflectance transparency 24 and to convert varying light intensities to voltage signals which are transmitted via line 32 to the reflectance channel of a radar simulator for utilization in producing a simulated radar presentation. The reflectance transparency and the particular utilization circuitry and simulator apparatus served by the photomultiplier 30 form no actual part of the present invention, the foregoing brief description being solely to provide a better understanding of the environment in which the invention itself may be used. Suffice it to say further that the radar simulator utilization circuitry or apparatus may be similar to those described in United States Patent No. 3,067,526 to E. E. Gray et al. and in United States Patent No. 3,131,247 to D. A. Benamy et al.

Figure 3:
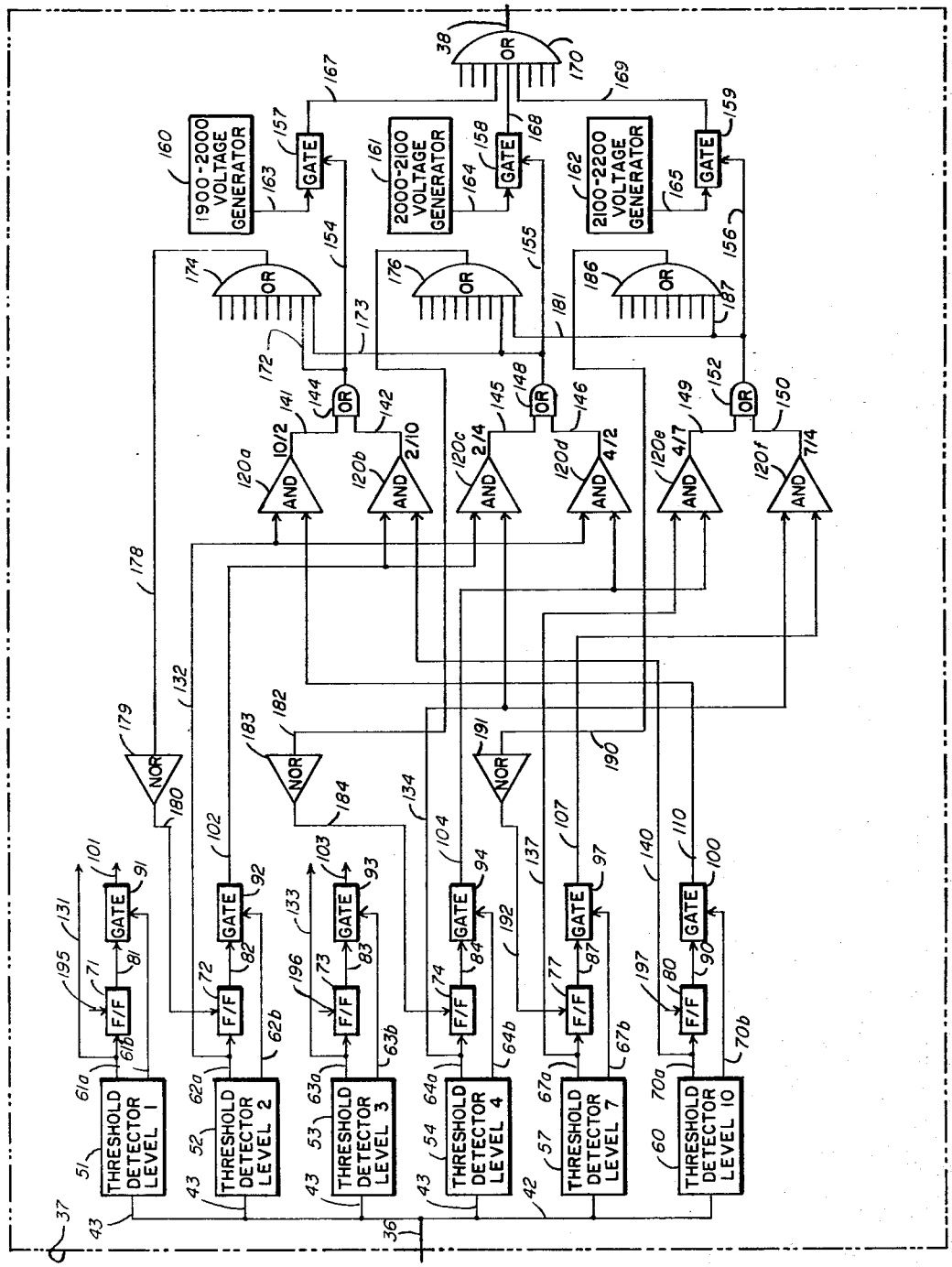
FIG. 3 is a block schematic and functional illustration of a portion of the logic circuitry forming part of the simulator of FIG. 1.

Another light responsive means such as elevation photomultiplier 35 is disposed to receive light transmitted from the flying spot scanner 20 through the elevation transparency 25 and to convert varying light intensities to voltage signals which are transmitted via line 36 to logic circuitry, generally indicated at 37 in FIG. 1, for elevation signal generation later more fully described with reference to FIG. 3. The logic circuitry 37 provides elevation voltage signals as an output via line 38 to the elevation channel of radar simulator means such as described in the above mentioned patents.

Figure 2:
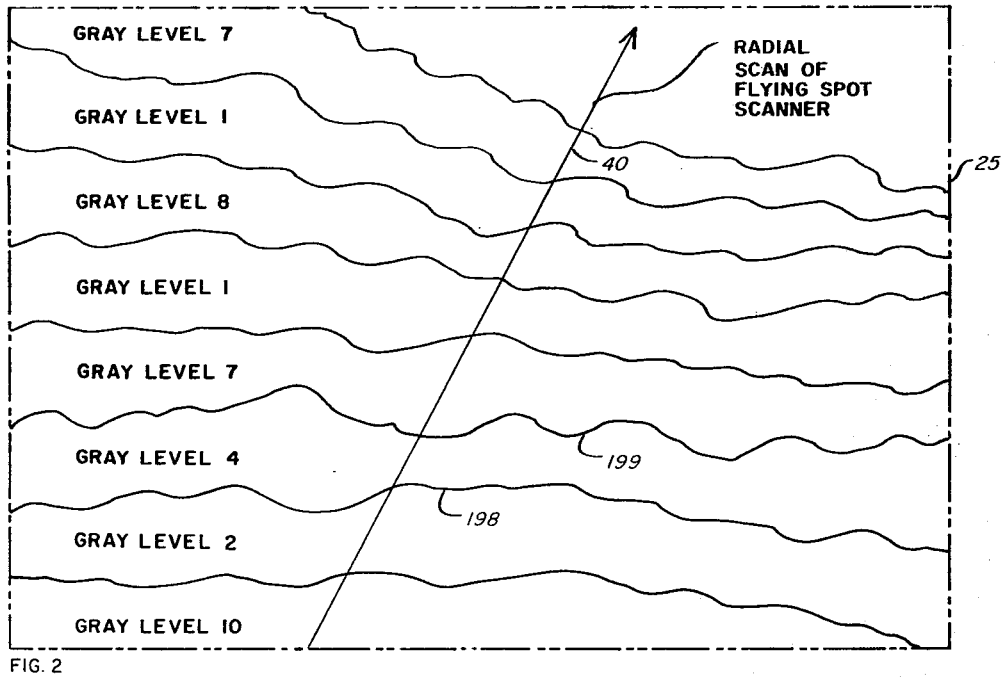
FIG. 2 is an enlarged fragmentary view of a portion of a factored transparency having elevation data encoded thereon in gray levels.

The varying light intensities transmitted by the transparency 25 to the photomultiplier 35 are effected by encoding on the transparency terrain elevation data in the form of a plurality of gray level areas as shown in FIG. 2. For convenience the gray level areas will be referred to hereinafter merely as "gray levels" or "gray level number—." In the present example there will be ten gray levels (not all of which appear in FIG. 2) which may be combined in pairs, each combination of two gray levels being assigned a specific elevation value as set forth in the following table:

ELEVATION VALUES vs. GRAY LEVEL PAIRS

| Elevation Values in Feet: | Gray Level Pairs by Number |
|---|---|
| 0–100 | 1/2 |
| 100–200 | 2/3 |
| 200–300 | 3/4 |
| 300–400 | 4/5 |
| 400–500 | 5/6 |
| 500–600 | 6/7 |
| 600–700 | 7/8 |
| 700–800 | 8/9 |
| 800–900 | 9/10 |
| 900–1000 | 10/1 |
| 1000–1100 | 1/3 |
| 1100–1200 | 3/5 |
| 1200–1300 | 5/7 |
| 1300–1400 | 7/9 |
| 1400–1500 | 9/1 |
| 1500–1600 | 1/4 |
| 1600–1700 | 4/6 |
| 1700–1800 | 6/8 |
| 1800–1900 | 8/10 |
| 1900–2000 | 10/2 |
| 2000–2100 | 2/4 |
| 2100–2200 | 4/7 |
| 2200–2300 | 7/1 |
| 2300–2400 | 1/8 |
| 2400–2500 | 8/2 |
| 2500–2600 | 2/5 |
| 2600–2700 | 5/8 |
| 2700–2800 | 8/4 |
| 2800–2900 | 4/9 |
| 2900–3000 | 9/2 |
| 3000–3100 | 2/6 |
| 3100–3200 | 6/1 |
| 3200–3300 | 1/5 |
| 3300–3400 | 5/9 |
| 3400–3500 | 9/6 |
| 3500–3600 | 6/10 |
| 3600–3700 | 10/7 |
| 3700–3800 | 7/3 |
| 3800–3900 | 3/10 |
| 3900–4000 | 10/5 |

As will be apparent from the above table, ten gray levels may be combined in combinations of two to provide forty combinations which are assigned to a like number of specific elevation increments. It will also be apparent from perusal of the table that each gray level pair (with the exception of the first pair) includes one of the gray levels of the immediately preceding pair when the assigned elevational increments are arranged in progressive sequence as shown. Usually, elevational changes in terrain are more or less gradual and result in progressively increasing or decreasing incremental values when coded, and accordingly a progressive table such as that given about permits the most desirable arrangement of gray levels on the transparency since for most terrain coverage each gray level area on the transparency is part of two adjacent gray level pairs. It should be kept in mind, however, that the invention is not necessarily limited to such preferred progressive arrangements and that when no regard to sequence is important, additional different gray level pairs may be made from the ten gray levels (e.g., 8/3, 9/3) and each additional pair assigned an elevational or other value depending upon the application to which the invention is to be put. Of course the use of ten gray levels was chosen for purposes of example and it will be understood that as many more gray levels may be used as desired within the earlier mentioned practical limits with correspondingly outstanding increases in the total number of elevation values that can be represented by combinations of gray levels.

The gray levels are formed on the factored member such as the transparency 25 in any well known manner such as by photographic emulsion techniques, and are arranged in the nature of a contour map as shown in FIG. 2.

The transparency 25 is scanned by the spot of light from the flying spot scanner 20, a single radial scan being indicated in FIG. 2 at 40, and changes in light transmission as the spot traverses the different gray levels are detected by the photomultiplier 35. It is the change in the output voltage of the photomultiplier 35 corresponding to travel of the spot of light from one gray level to another of a predetermined pair of adjacent gray levels which is utilized by the present invention to provide a voltage signal characteristic of the elevation value assigned to that pair of gray levels. This is accomplished by the logic circuitry 37 which will now be described in more detail with reference to FIG. 3.

The voltage output of elevation photomultiplier 35 is fed via line 36 as an input to the logic circuitry 37 wherein the voltage is directed by a line 42 and a plurality of parallel lines 43 to each of a plurality of threshold detectors 51–60 (of which only detectors 51, 52, 53, 54, 57 and 60 are shown). The threshold detectors 51–60 correspond to gray levels 1–10, respectively, and each is operative to provide a "true" or a "not true" output signal for its corresponding gray level. That is to say, the threshold detector 51 will provide along an output line 61a, a "true" output signal for gray level number 1 when the photomultiplier 35 detects light from the flying spot scanner being transmitted by gray level number 1 of the transparency 25. Alternatively, the threshold detector will provide along an output line 61b, a "not true" output signal for gray level number 1 whenever the photomultiplier 35 does not detect light transmitted by gray level number 1. The threshold detectors 51–60 may be of any suitable type such as, for example, one of the well known Schmitt trigger circuits.

The threshold detector 52 is provided with "true" and "not true" output lines 62a and 62b, respectively, for output signals indicative of the presence or absence of scanning light transmission through gray level number 2, threshold detector 53 is provided with similar output lines 63a and 63b for "true" and "not true" signals indicative of transmission through gray level number 3, and so forth through detector 60, which has output lines 70a and 70b for "true" and "not true" signals relating to gray level number 10.

The "true" signal output lines 61a–70a from the threshold detectors are connected to provide "true" signal inputs to respective ones of a plurality of flip-flops 71–80 which may conveniently be in the form of suitable bistable multivibrators. Each of the flip-flops is adapted to be set to a conductive state by the input of a "true" signal from its respective threshold detector to provide a "true"

signal output along respective output lines 81–90 which are connected to a plurality of gates 91–100.

The gates 91–100 are under the control of "not true" signals from the respective threshold detectors 51–60 via lines 61b–70b to gate the "true" signals as remembered by flip-flops 71–80, the gated outputs appearing on lines 101–110 as "hold" signals corresponding to past transmissions by the respective gray levels. The significance of these "hold" signals will become apparent as the description proceeds.

The "hold" signal lines 101–110 are connected to a plurality of AND gates of which only a representative portion are shown at 120a–120f. There are, in a complete logic circuitry, two such AND gates for each pair of gray levels to which an elevation value has been assigned. Each of the AND gates has as one input a "hold" signal received via one of lines 101–110 and as another input a "true" signal via one of a plurality of lines 131–140 which are connected to derive "true" signals directly from the threshold detectors. Thus, in the present example wherein there are 10 gray levels and 40 combinations or pairs of gray levels to which elevation values have been assigned, there will be 80 of the AND gates of which 120a–120f are representative.

Each of the two AND gates corresponding to a given gray level pair have their outputs connected to a single OR gate corresponding to that pair. Accordingly, AND gates 120a and 120b, each of which corresponds to a combination of gray level number 10 and gray level number 2, have their outputs connected by lines 141 and 142 to OR gate 144. Similarly, AND gates 120c and 120d, each of which corresponds to a combination of gray level number 2 and gray level number 4, have their outputs connected by lines 145 and 146 to OR gate 148, and AND gates 120e and 120f, each of which corresponds to a combination of gray level number 4 and gray level number 7, have their outputs connected by lines 149 and 150 to OR gate 152.

The outputs of OR gates 144, 148, and 152 are in the form of gating signals which are conveyed by lines 154, 155 and 156 to gates 157, 158 and 159, respectively. A plurality of voltage generators 160, 161, and 162 are connected by lines 163, 164 and 165 to the gates 157, 158 and 159. Generators 160, 161 and 162 provide predetermined voltages which are indicative of specific elevation values which have been assigned to given pairs of gray levels. In the present example the voltage output of generator 160 is indicative of an elevation value in the range of 1900 to 2000 feet, which elevation value has been assigned to the pair of gray levels numbers 2 and 10 according to the code previously set forth.

Generator 161 is indicative of elevation values in the range of 2000 to 2100 feet as assigned to the gray level pair 2 and 4, while generator 162 is indicative of elevation values in the range of 2100 to 2200 feet as assigned to the gray level pair 4 and 7.

Upon signal from the corresponding OR gate 144, 148 or 152, the outputs of the generators 160, 161 or 162 is gated by gate 157, 158 or 159 via line 167, 168 or 169 to an OR gate 170 which places the gated voltage on line 38 as the output of the logic circuitry 37. Of course, the voltage generators 160, 161 and 162, the OR gates 144, 148 and 152, and gates 157, 158 and 159 are merely representative of the total number of similar elements in the logic circuitry 37, there being similar generators and gates for each of the gray level pairs and assigned elevation values in the code to be used. Hence, in the present example, there would be 40 such voltage generators, etc. The gating signal output of OR gate 144 is also applied via a line 172 to an additional OR gate 174. Similarly, the gating signal output of OR gate 148 is applied via a line 173 to the additional OR gate 174, and also via a line 175 to yet another OR gate 176. The additional OR gates 174 and 176 also receive as inputs gating signals from each other OR gate representing gray level pairs or combinations including the gray level number 2 and the gray level number 4, respectively. The output of OR gate 174 is connected by line 178, a NOR gate 179 and a line 180 to the flip-flop 72 connected to the threshold detector 52 for gray level number 2. This circuit is used to reset the flip-flop 72 and thereby remove the gray level number 2 "hold" signal output from gate 82 when no elevation value assigned to a combination of gray levels including gray level number 2 is active or in use.

The OR gate 176 receives also an input from OR gate 152 via line 181 as well as inputs from all other similar OR gates corresponding to gray level pairs having gray level number 4 as one of the pair. OR gate 176 is connected by line 182, NOR gate 183, and a line 184 to the flip-flop 74 and a signal thereto from the OR gate 176 serves to reset this flip-flop and remove the gray level number 4 "hold" signal. Similarly, an OR gate 186 receives an input from OR gate 152 via lines 181 and 187, as well as inputs from all of the other similar OR gates corresponding to gray level pairs having gray level number 7 as one of the pairs. OR gate 186 is connected by line 190, NOR gate 191 and line 192 to the flip-flop 77 and serves to clear the "hold 7" signal when no elevation value assigned to a combination or pair of gray levels using gray level number 7 is active. Each of the other flip-flops have clearing signal input lines from other OR gates (not shown) similar to OR gates 174, 176 and 186. Thus, flip-flops 71, 73 and 80 are provided with clearing signal input lines 195, 196 and 197 respectively, by which these flip-flops are cleared when gray levels 1, 3 and 10 are inactive.

Operation of the logic circuitry 37 will now be described, assuming first that the light beam is traveling in the direction indicated by the arrow 40 in FIG. 2 and is scanning across gray level change 2/4. That is, the beam or spot is crossing the boundary 198 between gray level number 2 and gray level number 4. The gray level number 2 has been first detected by threshold detector 52 and flip-flop 72 has been set to provide a "number 2 true" output on line 62a. When gray level number 4 is detected by threshold detector 54, the signal "number 2 not true" on line 62b from detector 52 is used to cause gate 92 to gate the "number 2 true" signal (now designated "hold 2") as remembered by the flip-flop 72 to the appropriate AND gates, of which 120b and 120c are representative. The "hold 2" and the "number 4 true" signals are combined in AND gate 120c to supply a control signal, via OR gate 148 and line 155, for causing gate 158 to gate the output of the 2000–2100 feet generator 161. This voltage generator output or signal is then gated by gate 158 and OR gate 170 to the elevation channel of a simulator until a new gray level is detected. In this example, the gray level next detected is number 7 which is detected by threshold detector 57 as the light spot scans from gray level number 4 to gray level number 7 across the boundary 199 therebetween. Thereupon a "number 7 true" signal is transmitted from detector 57 via lines 67a, 137 to the AND gate 120e. The "hold 4" and the "number 7 true" signals are combined in the AND gate 120e to produce a control signal for gating the output of the 2100–2200 feet voltage generator.

At the same time that the "number 4 true" signal disappears and the "number 7 true" signal appears, the control signal for the 2000–2100 feet voltage generator drops to zero because the 2/4 AND gate 120c has only one input, namely "hold 2." The number 2 level OR gate 174 then has zeros on all of its inputs and a corresponding signal therefrom, which indicates that no elevation using gray level number 2 is active, is used to reset the level number 2 flip-flop 72 and thus remove the "hold 2" signal to AND gate 120c.

Similar sequences of events occur when the scan crosses the boundaries between other pairs of gray levels to produce voltage signal outputs at the output line 38 corresponding to the elevation values assigned in the aforementioned code. The voltage signal outputs are applied to the elevation input channel of a radar simulator and utilized therein in the same manner as voltage signals representative of elevation values are utilized in the radar simulators described in the previously mentioned United States patents.

Obviously many modifications and variations of the present invention are possible in the light of the above teachings. It is therefore to be understood that within the scope of the appended claims the invention may be practiced otherwise than as specifically described.

What is claimed is:

1. In a radar simulator, an elevation signal generator comprising:
   a flying spot scanner;
   a factored storage member having coded elevation information stored thereon in the form of a plurality of pairs of adjacent areas of predetermined gray levels disposed to be traversed by a spot of light from said scanner, each of said gray level pairs being representative of a predetermined elevation;
   photomultiplier means disposed to receive scanner light transmitted thereto from said storage means, said photomultiplier means providing an output corresponding to light received from each of said gray levels;
   logic means responsive to changes of said photomultiplier output to provide elevation signals corresponding to elevational values represented by traversal of said scan from one gray level to another of predetermined pairs of gray levels.

2. In a radar simulator, an elevation signal generator as defined in claim 1 and wherein said logic means comprises:
   detector means responsive to said photomultiplier output to provide "true" output signals indicative of which of said gray levels is being scanned;
   memory means responsive to change of the output of said detector means from one "true" signal to another to provide a "hold" signal indicative of the last gray level scanned prior to an existing "true" signal;
   AND means for combining said "hold" and existing "true" signals to provide outputs corresponding to scanning of predetermined gray level pairs.

3. In a radar simulator, an elevation signal generator as defined in claim 2 and comprising:
   means responsive to said last mentioned outputs for providing on a single output line a different voltage level for each of said gray level pairs scanned, said voltage levels corresponding to elevational values assigned to predetermined gray level pairs.

4. In a radar simulator, an elevation signal generator as defined in claim 3 and comprising:
   means responsive to the outputs of said AND means to provide clearing signals to said memory means for eliminating the "hold" signals corresponding to given gray levels when no combinations utilizing those "hold" signals exist at said AND means.

5. In a radar simulator, an elevation signal generator as defined in claim 1 and wherein said logic means comprises:
   a plurality of threshold detectors each responsive to said photomultiplier output to provide a "true" output signal for a different one of said gray levels and a "not true" signal for the other gray levels;
   a plurality of flip-flops each associated with one of said threshold detectors and responsive to "true" signals therefrom to pass said "true" signals as an output thereof;
   a plurality of first gate means each responsive to a "not true" signal from one of said threshold detectors and to a previous existing "true" signal of the same gray level passed by the flip-flop to provide a "hold" signal output for that level;
   a plurality of AND gates, two for each of said pairs of gray level, one of each two AND gates providing an output in response to a "hold" signal corresponding to one of the levels of a gray level pair and to a "true" signal corresponding to the other of the levels of said gray level pair, the other of said two AND gates providing an output in response to a "hold" signal correpsonding to said other of the levels of the levels of the last mentioned gray level pair and to a "true" signal corresponding to said one of said levels of that pair;
   a plurality of first OR gates each responsive to one or the other of the outputs of two of said AND gates corresponding to a predetermined pair of gray levels;
   a plurality of elevation signal generators each corresponding to a predetermined one of said pairs of gray levels;
   a plurality of second gate means each responsive to one of said first OR gates to pass elevation signals from the signal generator corresponding to a predetermined pair of gray levels;
   an additional OR gate having a plurality of input channels each connected to the elevation signal output of one of said second gate means, and adapted to pass any one of said elevation signals as an output to a utilization means.

6. In a radar simulator, an elevation signal generator as defined in claim 5 and comprising:
   gate means responsive to the outputs of said first OR gate means to provide clearing signals to said flip-flops for eliminating the "hold" signals corresponding to given gray levels when no combinations utilizing those levels exist at said AND gates.

No references cited.

RICHARD A. FARLEY, *Primary Examiner.*

RODNEY D. BENNETT, *Examiner.*

T. H. TUBBESING, *Assistant Examiner.*